United States Patent [19]

Leib

[11] 4,447,111

[45] May 8, 1984

[54] ACHROMATIC HOLOGRAPHIC ELEMENT

[75] Inventor: Kenneth G. Leib, Wantagh, N.Y.

[73] Assignee: Grumman Aerospace Corporation, Bethpage, N.Y.

[21] Appl. No.: 352,362

[22] Filed: Feb. 25, 1982

[51] Int. Cl.³ .............................................. G02B 5/32
[52] U.S. Cl. .................................... 350/3.7; 350/320
[58] Field of Search ...................... 350/3.7, 3.77, 3.72, 350/3.73, 320

[56] References Cited

U.S. PATENT DOCUMENTS

| | | | |
|---|---|---|---|
| 3,405,614 | 3/1970 | Lin et al. | |
| 3,503,050 | 3/1970 | Schools et al. | 340/173 |
| 3,586,412 | 6/1971 | Leith | 350/3.5 |
| 3,630,593 | 12/1971 | Bartelt | 350/3.5 |
| 3,680,945 | 8/1972 | Sheridon | 350/3.5 |
| 3,970,358 | 7/1976 | Kozma | 350/3.73 |
| 4,017,158 | 4/1977 | Booth | |
| 4,250,465 | 2/1981 | Leib | 331/94.5 |

OTHER PUBLICATIONS

Horner et al., "Single Holographic Element Wavelength Demultiplexer" *Applied Optics*, vol. 20, No. 10, May 15, 1981, pp. 1845–1847.

Kenneth G. Leib, *Investigation and Implementation of Optical Memory for a Correlation Seeker*, Jul. 1983, pp. 2-1, 2-2 & 2-3.

*Primary Examiner*—Bruce Y. Arnold
*Attorney, Agent, or Firm*—Richard G. Geib

[57] ABSTRACT

A process for producing a holographic optical element which operates at a multiplicity of wavelengths and which has no chromatic aberration is disclosed. The achromatic holographic elements are fabricated using substantially conventional apparatus employing a technique based on the phenomenon that any two playback wavelengths will be diffracted to the same angle if their construction angles are related to each other as the inverse of the ratio of their sines. In addition, in the case of holographic lenses, if the focal points during construction are related to each other as the inverse of the ratio of the sines of their construction angles, the diffracted wavelengths will be brought to a common focal point.

10 Claims, 12 Drawing Figures

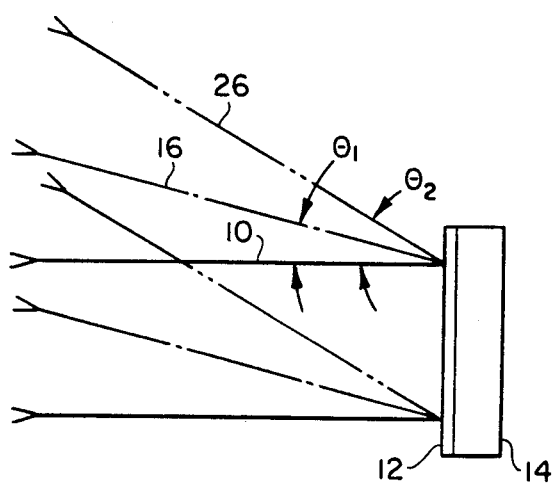
FIG.1
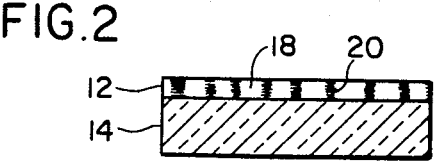
FIG.2
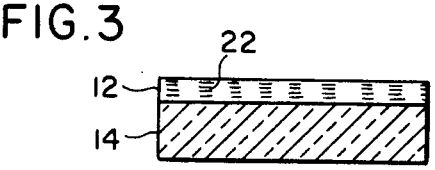
FIG.3
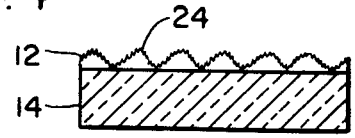
FIG.4
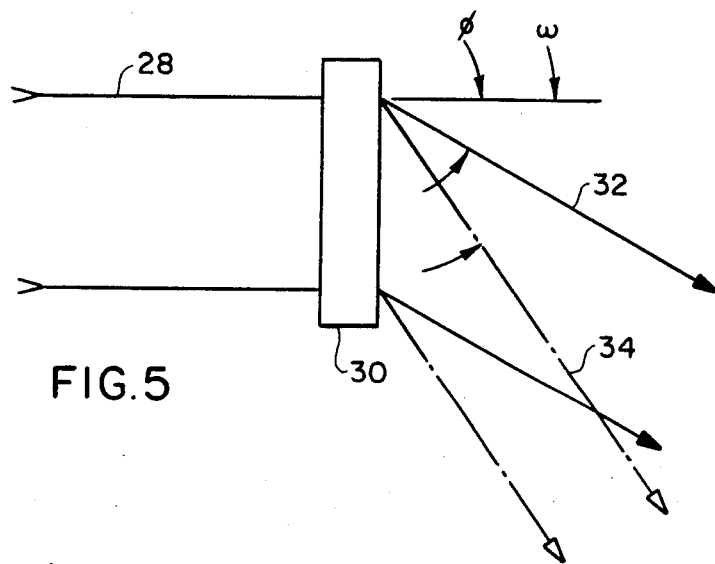
FIG.5
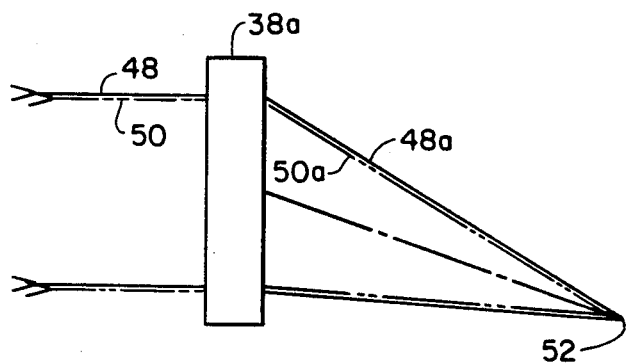
FIG.6
FIG.7

ACHROMATIC HOLOGRAPHIC ELEMENT

BACKGROUND OF THE INVENTION

1. Field Of The Invention

This invention relates to holographic optical elements and, more particularly, achromatic holographic optical elements and to a method of making the same.

2. Background Of The Invention

The term "hologram" is used to describe a photographic process that is becoming increasingly commonly used. Unlike ordinary photography, which consists of a recording of a three-dimensional scene as a two-dimensional image, the holographic process does not record an image of the object being photographed but, instead, records the reflected light waves themselves as they form an interference light pattern with a reference beam originating from the same source. Thus, the hologram contains all the information characterizing an object through which the light waves have passed or from which they have been reflected or scattered. If the object is an optical element such as a lens, matched filter, or diffraction grating, a hologram thereof will produce all the phenomena and attributes of that optical element; representative characteristics of holographic optical elements are focal point, scale size, and deflection angle respectively.

Conventionally, the hologram comprising the holographic optical element is made by using a laser of a particular wavelength, termed the construction (C) wavelength; and the playback (PB), or reconstruction wavelength of the holographic element is accomplished using a laser of the same or other wavelength. In conventional holography, if a laser of a different wavelength is used for the playback, the essential character of the holographic optical element, including deflection angle, focal point, and scale size, will change.

SUMMARY OF THE INVENTION

In some applications of holographic optical elements it would be desirable to retain a performance parameter regardless of the wavelength of the laser employed for the playback function. The subject invention is a means and the process of uniquely fabricating those means for substantially alleviating the wavelength dependency of holographic optical elements.

In the construction of holographic optical elements, as shown in FIG. 1, an input beam 10, called the signal beam S, is projected such that it is incident upon a recording medium 12 which can be coated or mounted on a suitable substrate 14, such as a glass plate, thin film, and the like. As is well known, the recording medium 12 can be a photogrphic emulsion, dichromated gelatin, a photopolymer, and the like. Simultaneously, and from the same source of coherent electromagnetic radiation, which source preferably is a laser, a second beam 16, called the reference beam R, is directed at an angle $\theta_1$ so that it is incident upon the recording medium 12 such that it overlaps the signal beam 10 at the medium. The result is an optical intereference which is recorded in the medium as an amplitude or phase distribution of closely spaced lines. This line array may take various forms such as amplitude distribution of clear regions 18 and absorbing regions 20 in the recording medium 12 as illustrated in cross section in FIG. 2; or the phase distribution caused by differences in the indices of refraction 22 in the recording medium 12 as shown in FIG. 3; or spatial or relief variations 24 in the surface of the recording medium 12 as shown in FIG. 4. As is well known, each of these forms represents a different phenomenon: the first, absorption via silver halides; the second, diffraction through refractive index changes; and the third, diffraction through variations in surface relief. In the latter case, absorptive or refractive index variation regions may also accompany the surface relief pattern of the recording medium or plate.

In the optical interference phenomenon shown in FIG. 1, the spacing of the optical interference lines, also known as the fringe lines, is determined by the equation $$d_1 = \lambda_1 / \sin \theta_1 \quad (1)$$

where
- $d_1$ = spacing of the optical interference lines
- $\lambda_1$ = wavelength of interfering beams
- $\theta_1$ = angle between the interfering beams as shown in FIG. 1 for the case in which the signal beam 10 is normal to the recording plate.

When the latter condition does not prevail, the general expression $$d = (\lambda / (\sin \theta_S \pm \sin \theta_R) \quad (1a)$$

prevails. When both beams are on the same side of the recording plate normal, the minus (−), sign prevails; when on opposite sides, the positive (+) sign prevails. However, no loss of generality results by assuming $\theta_S = 0$ so it is possible to use Equation (1) in this description.

For a complex or extended object, Equation (1a) would be more appropriately expressed as $$d = \lambda / (\sin \theta_S(x,y) \pm \sin \theta_R) \quad (1b)$$

showing that the signal beam incident angle depends upon a two-dimensional distribution of source points.

If a reference beam 26 at a different angle $\theta_2$ but same wavelength is used, the recorded fringe pattern will be at a different fringe spacing, i.e., $$d_2 = 80_1 / \sin \theta_2 \quad (1c)$$

Note that a common wavelength $\lambda_1$, is used and only the angle $\theta$ has been changed. Assume also that both fringe patterns were recorded in sequence in the same recording medium.

With reference now to FIG. 5, assume that the input beam 28 which is incident upon a recording plate 30 is a combination of two wavelengths and, further that the incident beam has been recorded and the recording medium suitably processed. In the reconstruction process, the wavelengths comprising the input beam can be designated $\lambda_{PB1}$, $\lambda_{PB2}$. One of the two wavelengths can be the construction wavelength $\lambda_1$, but such condition is not essential and, for the purposes of this exposition, the assumption can be made that it is not. Upon playback, the normal condition is that the different wavelengths will be diffracted through different angles. Thus, the output beam 32 of $\lambda_{PB1}$ of the input beam 28 will be diffracted through an angle $\phi$ and output beam 34 of $\lambda_{PB2}$ of input beam 28 will be diffracted through an angle $\omega$.

In the construction of an achromatic optical element, such as a grating, the question is whether or not two wavelengths can be simultaneously incident upon the grating or similar diffraction element (at $\theta_S=0$) and still give the same angle of diffraction.

The diffraction equation is $$\sin D = (m\lambda/d) \quad (1d)$$

where m is the order of the grating and D is the diffraction angle when a beam of wavelength $\lambda$ is normally incident upon a grating whose fringe spacing is d.

Since a common angle, D, is desired $$\sin D_1 = \sin D_2 = \sin D = (m\lambda/d)$$

or $$\sin D = \frac{m\lambda_{PB1}}{d_1} = \frac{m\lambda_{PB2}}{d_2} \quad (2)$$

$$= \frac{m\lambda_{PB1}}{\lambda_1}\sin\theta_1 = \frac{m\lambda_{PB2}}{\lambda_1}\sin\theta_2$$

or $$\frac{\lambda_{PB1}}{\lambda_{PB2}} = \frac{\sin\theta_2}{\sin\theta_1}.$$

In other words, two wavelengths will be diffracted to the same angle D by the grating if they are related to each other as the inverse of the ratio of the sines of their construction angles. This is extendable to any number of wavelengths provided:

(a) the beams are normally incident on the grating,
(b) they are made at one wavelength, $\lambda_1$,
(c) the general relationship $$(\lambda_i/\lambda_j) = (\sin\theta_j/\sin\theta_i) \quad (2a)$$

from Equation (2) holds. It is not necessary that the grating be made at one wavelength if compensation is made in accordance with Equation (1d) when there is more than a single construction wavelength. The latter case might be a little unusual, but it is not precluded.

Consider now the relationship which holds for the focal length of a holographic lens (HL)

$$F_{PB} = (\lambda_C/\lambda_{PB})F_C \quad (3)$$

where F and $\lambda$ respectively are the focal length and wavelength applicable for the construction of the holographic optical element and reconstruction or playback using the holographic optical element.

For two wavelengths, $$F_{PB1} = (\lambda_C/\lambda_{PB1})F_{C1} \quad (3a)$$

$$F_{PB2} = (\lambda_C/\lambda_{PB2})F_{C2} \quad (3b)$$

Upon playback or reconstruction, $F_{PB1} = F_{PB2}$ are wanted so that $$(\lambda_C/\lambda_{PB1})F_{C1} = (\lambda_C/\lambda_{PB2})F_{C2} \quad (3c)$$

Since it has been shown above that $\lambda_{Ci} = \lambda_{PBi}$ $$\frac{\lambda_{PB2}}{\lambda_{PB1}} = \frac{\lambda_{C2}}{\lambda_{C1}} \frac{F_{C2}}{F_{C1}} = \frac{\sin\theta_1}{\sin\theta_2} \quad (3d)$$

or since $\lambda_{C1}$ can be made the same as $\lambda_{C2}$, thus $\lambda_{C1} = \lambda_{C2}$, hence $$(C_2/F_{C1}) = (\sin\theta_1/\sin\theta_2) \quad (3e)$$

which formula is seen to be similar to (2a).

To give a specific example having the chosen parameters of:

$\lambda_C = 4880$ Å

$F_{C1} = 360$ mm $\theta_1 = 30°$ then if $\left.\begin{array}{l}\lambda_{PB1} = 4880 \text{ Å} \\ \lambda_{PB2} = 6328 \text{ Å}\end{array}\right\}$ (chosen because these two are common laser wavelengths)

$\theta_2 = 22.68°$ and $F_{C1} = 360$ mm (Since the construction and one reconstruction wavelength are one and the same)

$F_{C2} = 466.8$ mm

With reference now to FIG. 6, one reference beam 36 is shown interacting at a recording plate 38 with one signal beam 40 whose construction focal length 42 is $F_{C1}$. A second signal beam 44 whose focal length 46 is $F_{C2}$ also interacts at the recording plate 38 with reference beam 36 to produce an interference pattern in the plate. Beams 36 and 40 must have the same wavelength and beams 36 and 44 must have a second common wavelength. If these wavelengths are not the same, the angle of incidence $\theta REF$ of the reference beams must be adjusted according to the equations given previously herein. After the usual known processing, the plate forms a holographic lens. If the numerical conditions given above are met, the holographic lens 38a so formed will function as indicated in FIG. 7. As shown, the input beams 48, 50 each of a different wavelength will be diffracted by the holographic lens 38a such that the combined output beams 48a, 50a respectively are brought to substantially a common focal point 52.

Typically, the recording medium used in the holographic process is about 1–20 microns in thickness. However, there are advantages to using what is known as "thick media," generally about 20–100 microns in thickness, for the process. Thick media for recording gratings is characterized by Klein's "Q" criteria where $$Q = (2\pi\lambda d/\eta_o \Lambda^2)$$

which, when the angle of incidence in the grating is $\gamma$, $$Q' = Q/\cos\gamma$$

where $\lambda$ is the free space wavelength, d is the thickness of the recording medium, $\eta_o$ is its average index of refraction, and $\Lambda^2$ is the grating spacing (here assumed evenly spaced).

When a grating is recorded in a thick medium, the angle of incidence upon playback must be considered as well as the grating spacing and the angle of incidence based upon the spacing only. This is due to the Bragg effect. Incident angles obeying the Bragg law are highly efficient beams; those which do not are inefficient and may be attenuated. Bragg's law is:

$$2dN \sin \theta = \lambda \quad (4)$$

where N is the index of refraction.

Consider FIG. 8. When two beams 92, 94 interfere at angles $\theta_{C1}$ and $f'_{C1}$, fringes 96 in the thick recording medium 97 are formd and the playback angle for maximum efficiency must be $\theta_{PB1}$ (98) where $\theta_{PB1}$ is determined from Equation (4):

$$\sin \theta_{PB1} = \frac{\lambda}{2d} \quad (5)$$

$$= \left(\frac{\lambda_{PB1}}{\lambda_{C1}}\right) \frac{\sin \theta_{C1} \pm \sin \theta'_{C1}}{2}$$

Suppose a second set of angles is used (and initially a second wavelength); then $$\sin \theta_{PB1} = \sin \theta_{PB2} = \sin \theta_{PB} \quad (6)$$

or using Equation (5) for both cases, we end with $$\left(\frac{\lambda_{PB1}}{\lambda_{PB2}}\right)\left(\frac{\lambda_{C2}}{\lambda_{C1}}\right) = \frac{\sin \theta_{C2} \pm \sin \theta_{C2}'}{\sin \theta_{C1} \pm \sin \theta_{C1}'} \quad (7)$$

If $\lambda_{C1} = \lambda_{C2}$, a normal but not necessary procedure, $$\left(\frac{\lambda_{PB1}}{\lambda_{PB2}}\right) = \frac{\sin \theta_{C2} \pm \sin \theta_{C2}'}{\sin \theta_{C1} \pm \sin \theta_{C1}'} \quad (7a)$$

and if $\sin \theta_{C1} = 0$, also a common but not necessary procedure, $$\left(\frac{\lambda_{PB1}}{\lambda_{PB2}}\right) = \frac{\sin \theta_{C2} \pm \sin \theta_{C2}'}{\sin \theta_{C1}'} \quad (7b)$$

the similarity to Equation (2a) should be noted. For playback at common Bragg angles, the wavelengths should be in the ratio given by Equation (7b). For example, if the playback wavelengths are to be 6328 Å and 4880 Å, and $\theta_{C1} = 0$, $\theta_{C1} = 30°$; then $$\frac{6328}{4880} = 1.30 = \frac{\sin \theta_{C2} \pm \sin \theta_{C2}'}{.5}$$

or $$\sin \theta_{C2} \pm \sin \theta_{C2} = 0.65$$

satisfied by $\theta_{C2} = 10°$, $\theta_{C2} = 27° \, 18'$ and many other combinations.

A common playback angle is determined from Equation (5) and is $\sin^{-1} 0.325 = 18° \, 35'$. It should be noted that one cannot arbitrarily set $\theta_{C2}$, $\theta'_{C2}$ and have a playback angle common with the playback of construction angles $\theta_{C1}$, $\theta'_{C1}$.

DESCRIPTION OF THE PRIOR ART

In the prior art, E. N. Leith, U.S. Pat. No. 3,586,412, discloses a method for constructing holographic lens in which a single, three-dimensional recording medium is exposed to two intersecting input beams at different angles to, in effect, scan an object, such that individual unaberrated zone plates are constructed in the medium for each angle of exposure so that a composite image of the object without significant aberration is obtainable. Leith, it is seen, also implies use of his lens at multiple wavelengths, but does not specify the unique conditions necessary for obtaining achromatic playback. In the prior art, R. S. Schools et al., U.S. Pat. No. 3,503,050, disclose an improvement in the known Lippmann process. In the Schools et al. system, interfering waves of coherent light sensitize a layer of a photosensitive emulsion at antinodes of the standing waves throughout the thickness of the emulsion to form a periodic structure of reflecting surfaces. A plurality of such structures are formed at any one point in the emulsion at different angles and are read out by the angle of reflected light. However, as is the case with Leith, Schools et al do not demonstrate that the beam angles as recorded must be a specified unique set of angles so as to enable an assemble of wavelengths, or "white" light, to have a common focal point. Nor do these prior art disclosures teach that a specific arrangement of fringes on a non-thick recording medium surface must be specifically as prescribed for white light playback.

It is thus a principal object of the invention to provide holographic optical elements which operate at a multiplicity of wavelengths and which have reduced aberrations. It is a concurrent object of the invention to provide a method for producing such achromatic holographic optical elements.

It is another object of the invention to employ a "thick" recording medium such that a symmetrical pair of output beams having two independent focal points are produced with a single input beam.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

FIG. 1 is a diagrammatic view showing the optical inputs into the recording medium used in constructing a holographic optical element;

FIGS. 2-4 are cross-sectional views showing interference phenomenon associated with the various types of the recording medium of FIG. 1;

FIG. 5 is a diagrammatic view showing diffraction characteristics of a conventional holographic optical element;

FIG. 6 is a diagrammatic view showing the optical input into the recording medium used in fabricating holographic optical elements in accordance with the invention;

FIG. 7 is a diagrammatic view showing the diffraction characteristics of holographic optical elements of the invention;

DESCRIPTION OF THE PREFERRED EMBODIMENTS

Figure 9:
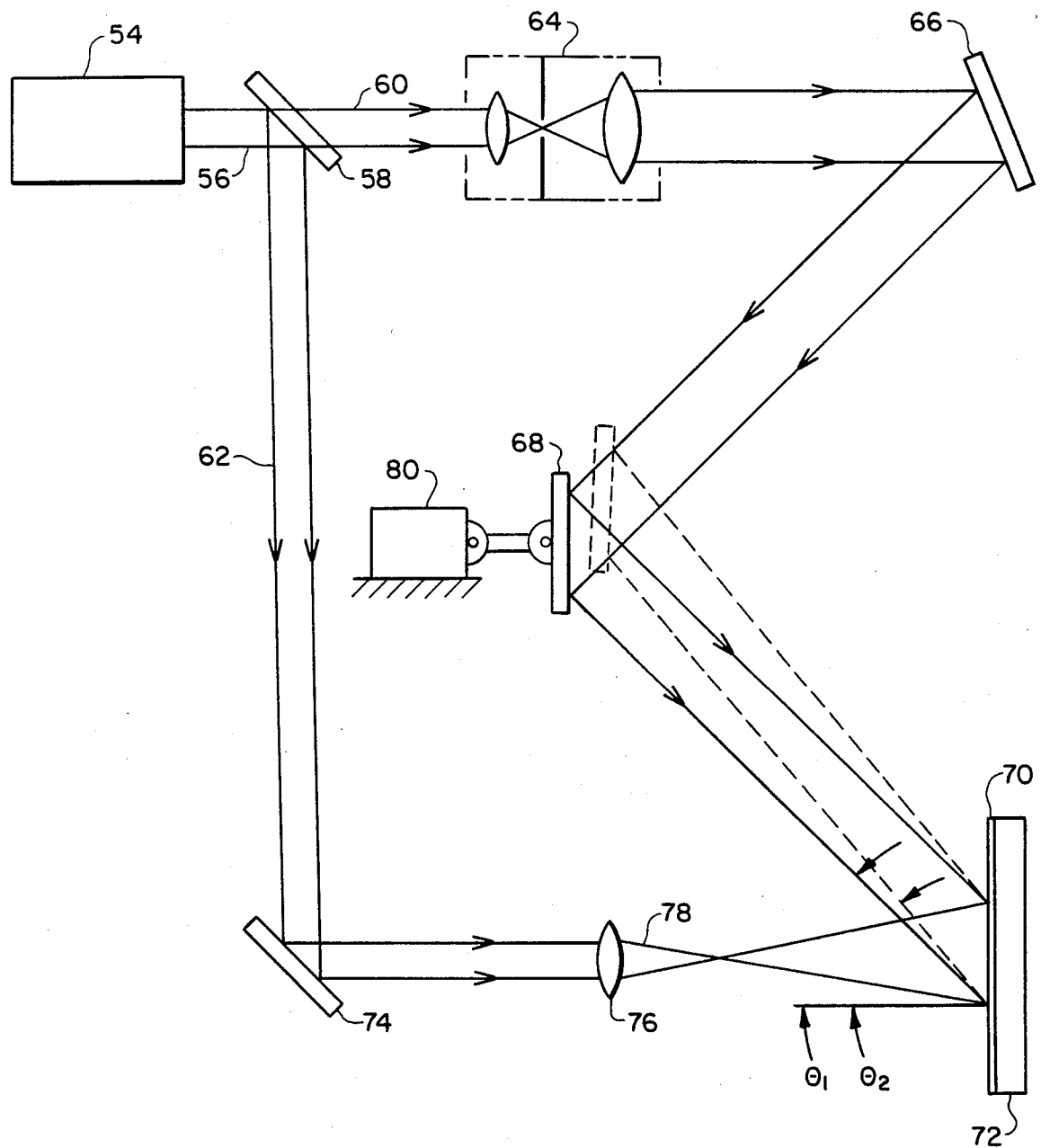
FIG. 9 is a diagrammatic view of a preferred embodiment of apparatus of the invention.

Having now more particular reference to the drawings, FIG. 9 illustrates apparatus used in the fabrication of a holographic optical element, such as a grating, of the invention. A suitable coherent light source such as a laser 54 operating at a wavelength $\lambda_{C1}$, has an output beam 56 which is passed through a beamsplitter 58 to produce beams 60 and 62 of approximately equal intensity. Beam 60, which is used as the holographic reference beam, is passed through a collimating lens system 64 and is directed by mirrors 66 and 68 so as to impinge at an appropriate angle $\theta_1$ upon a recording medium 70. Any suitable known photosensitive substance can be used as the recording medium and, if required, appropriate means such as a glass plate 72 can be provided for its support. Beam 62, which is used as the signal beam, is directed with a mirror 74 to a short focal length lens 76 whose output beam 78 is directed onto the recording medium 70. Beam 78 combines and interferes with reference beam 60 and that interference is recorded by the medium.

It will be recognized that the apparatus described to this point is essentially that used in the known process for fabricating conventional holographic optical elements. In the process of the present invention, however, once beam 60 is recorded at an angle of incidence $\theta_1$, the mirror 68 is adjusted by suitable adjustment means 80 and beam 60 is recorded interfering with beam 78 at an incidence angle $\theta_2$. As required, this procedure can be repeated to record interference at incidence angles $\theta_3 \ldots \theta_n$. It will be appreciated that, in accordance with the exposition of the invention given previously herein, beams of various wavelengths of light will be diffracted to the same angle by the holographic optical element if they are related to each other as the inverse of the ratio of their construction angles $\theta_i \ldots \theta_j$. Provided also, as stated previously, that the beams are normally incident on the element, they are made at one wavelength, and the general relationship $(\lambda_i/\lambda_j) = (\sin \theta_j / \sin \theta_i)$ from Equation (2) holds.

If the holographic optical element is a lens, achromatism, requires that the various wavelengths of the beam being diffracted be brought to substantially a common focal point. This action will occur if the numerical conditions embodied in Equations (3)–(3e) are met and $(F_{Cj}/F_{Ci}) = (\sin \theta_i / \sin \theta_j)$.

Figure 10:
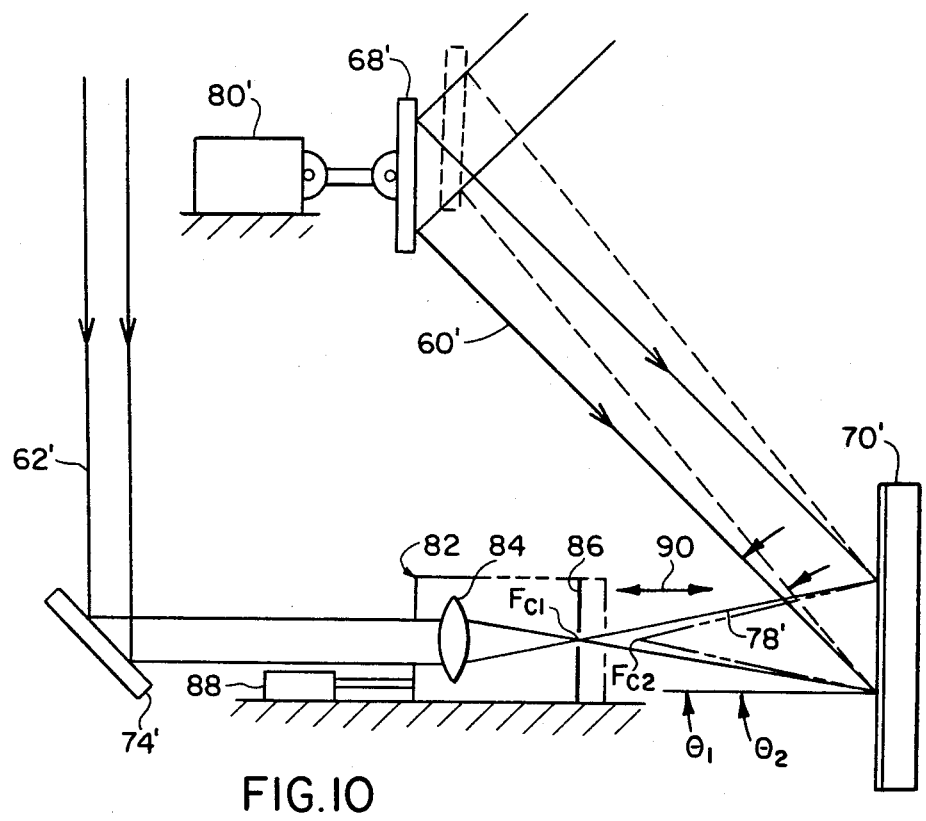
FIG. 10 is a fragmentary diagrammatic view of another embodiment of apparatus of the invention.

To provide the variations in focal length required during the construction of an achromatic lens of the invention, the apparatus embodied in FIG. 9 is modified as shown in FIG. 10 by the insertion of an adjustable pinhole assembly 82 in the path of the signal beam. Thus, although not shown, the embodiment of FIG. 10 will have the light source, beamsplitter, collimating lens system, and first mirror shown in FIG. 9 to produce a reference beam 60' and a signal beam 62'. Reference beam 60' is directed by adjustable mirror 68' to impinge at an appropriate angle $\theta_1$ upon a recording medium 70'. Signal beam 62' is directed with a mirror 74' to the pinhole assembly 82 which comprises a short focal length lens 84 and a pinhole diaphragm 86. A suitable adjustment mechanism 88 is provided to selectively adjust the pinhole assembly in translation as indicated by directional arrows 90. The output beam 78' from the pinhole assembly is an expanding spherical wave. This beam is directed onto recording medium 70' at a focal length of $F_{C1}$ so as to combine and interfere with the reference beam 60', that interference being recorded by the medium.

In the process of the invention, once reference beam 60' is recorded at an angle of incidence $\theta_1$ and signal beam 62' at a focus $F_{C1}$, the mirror 68' and the pinhole assembly 82 are adjusted by their adjustment means 80' and 88 respectively and beam 60' is recorded at an angle of incidence $\theta_2$ and beam 62' at a focus $F_{C2}$. As required, this procedure can be repeated to record interference of beams 60' and 62' at incidence angles $\theta_3 \ldots \theta_n$ and focuses of $F_{C3} \ldots F_{Cn}$.

Figure 11:
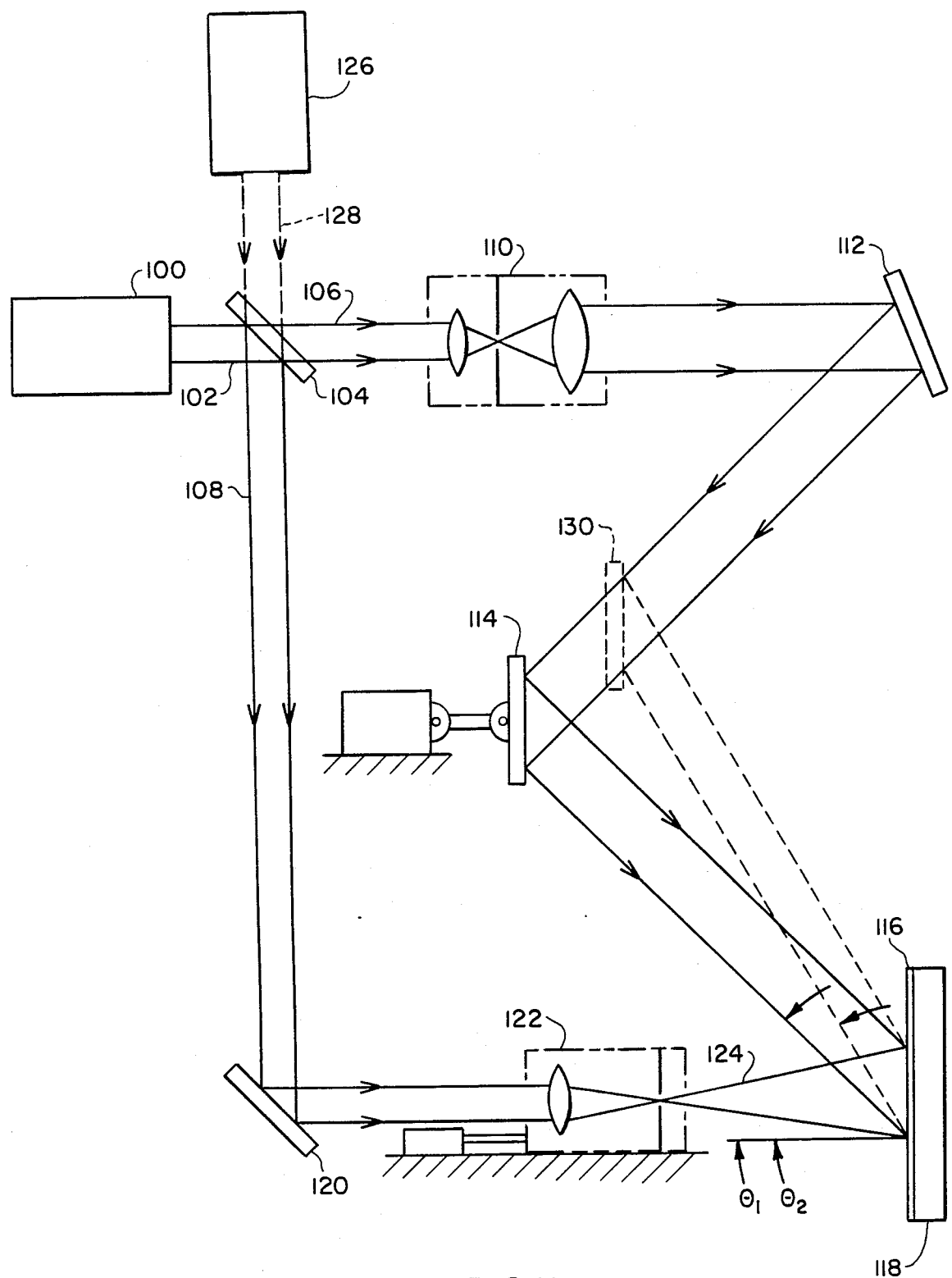
FIG. 11 is a diagrammatic view of yet another embodiment of apparatus of the invention.

The preceding description details the construction of achromatic holographic optical elements using coherent electromagnetic radiation of a single wavelength; however, radiation of more than one wavelength can be used to construct the optical elements provided the mathematical relationships of the invention are adhered to. With reference now to FIG. 11, the apparatus comprises a light source, such as a laser 100 operating at a wavelength $\lambda_{C1}$, having an output beam 102 which is passed through a beamsplitter 104 to produce a reference beam 106 and a signal beam 108. Reference beam 106 is passed through a collimating lens system 110 and is directed by mirrors 112 and 114 so as to impinge at an appropriate angle $\theta_1$ upon a recording medium 116 which is mounted on a suitable support 118. Signal beam 108 is directed with a mirror 120 to an adjustable pinhole assembly 122, the output beam 124 thereof being directed onto the recording medium 116 to combine and interfere with reference beam 106. As will be understood from the preceding description of the other embodiments of the invention, if the optical element being constructed is a lens, the pinhole assembly 122 will focus the signal beam 124 on recording medium 116 at a focus $F_{C1}$. If the optical element being constructed is a grating, a lens such as shown in the embodiment of FIG. 9 will be used instead of the pinhole assembly and adjustable means to vary the focal length of the signal beam thus is not used. The second source of radiation at a wavelength $\lambda_{C2}$ can be a laser 126 whose output beam 128 is directed through the beamsplitter 104 such that the light passing therethrough is aligned with signal beam 108 and the light reflected therefrom is aligned with reference beam 106. When the output of the second laser 126 is recorded, the mirror 114 and the pinhole assembly 122 are adjusted to record the intereference of the light beams at an angle of incidence $\theta_2$ and a focal length $F_{C2}$. This procedure can be repeated to record the interferences of the reference and signal beams at incidence angles $\theta_3 \ldots \theta_n$ and focal points of $F_{c3} \ldots F_{Cn}$. As has been discussed previously herein, if the general relationships $(\lambda_{C1}/\lambda_{C2}) = (\sin \theta_2/\sin \theta_1)$ and $(F_{C1}/F_{C2}) = (\sin \theta_2/\sin \theta_1)$ holds; upon playback, the two wavelengths $\lambda_{C1}$ and $\lambda_{C2}$ will be diffracted by the holographic optical element developed from recording medium 116 such that the output therefrom is brought to substantially a common focal point as illustrated in FIG. 7.

Instead of adjusting mirror 114 to vary the angle of incidence of reference beam 106 for a second or subsequent wavelengths, additional mirrors such as mirror 130 can be inserted into the beam. Suitable known means other than that shown can be utilized in this invention for producing controllably coherent radiation in a number of discrete wavelengths. Typical of such apparatus is the parametric converter or interacter disclosed in U.S. Pat. No. 4,250,465, granted to the inventor of the present invention and having the same assignee, which patent is incorporated herein by reference.

Figure 8:
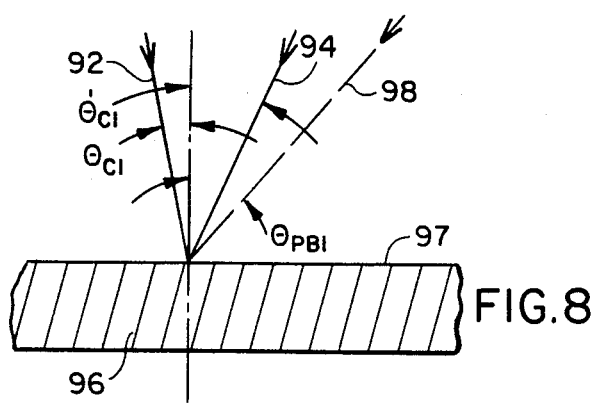
FIG. 8 is a diagrammatic view showing interference characteristics of thick recording media in accordance with the invention.
Figure 12:
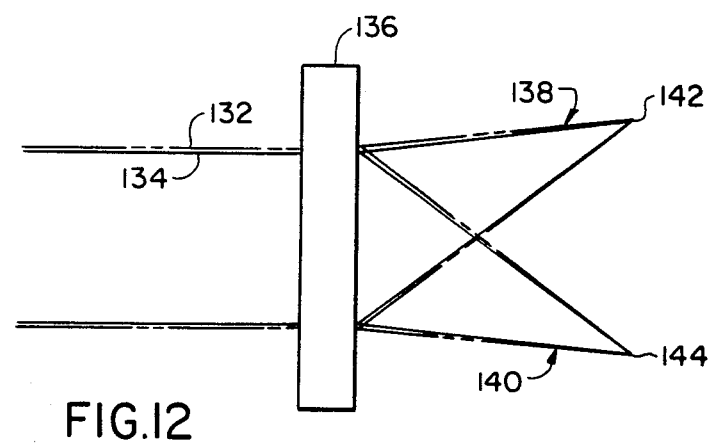
FIG. 12 is a diagrammatic view showing the diffraction characteristics of thick media in accordance with the invention.

There are advantages to using thick media in the process. Thick media, as discussed previously, is generally about 20–100 microns in thickness. When reference beams are directed from either side of the recording plate normal to record the hologram, there is a unique angle producing a symmetrical pair of output beams of equal energy for which the Bragg angle is simultaneously satisified. Thus, two independent focal points obtain (as shown in FIG. 12) from the thick media recording upon playback. As shown, the input beams 132 and 134, each of a different wavelength will be diffracted by the thick media holographic grating 136 as two output beams 138 and 140 having two independent focal points 142 and 144.

During the construction of the holographic element, the actual input angles depend upon the equations given herein previously, and upon the index of refraction of the material used for the thick media. For example, dichromated gelatin which has an index of refraction, $\eta = 1.54$; the reference beam incident angles for playback would be about $\pm 10$ degrees in order to obtain the conditions illustrated in FIG. 12.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

Having thus described my invention, what I claim is:

1. The method for fabricating an achromatic holographic optical element for diffracting radiation of wavelengths $\lambda_1 \ldots \lambda_n$ comprising the steps of:

making a first exposure in a three-dimensional photosensitive recording medium of the intersection of a first pair of mutually coherent electromagnetic beams having a wavelength of $\lambda_1$, said beams comprising a signal and a reference beam, said beams being incident on said recording medium with said signal beam being incident normal to said medium surface and said reference beam having an angle of incidence $\theta_1$ to said surface normal, said exposure forming a first diffraction means havng periodic structures in said medium;

making further exposures in said recording medium of the intersection of further pairs of mutually coherent electromagnetic beams having a wavelength $\lambda_1$, each of said beam pairs comprising a signal and a reference beam, said reference beams of said pairs being incident at an angle, $\theta_2$ through $\theta_n$ respectively on said recording medium, said exposures forming further overlapping diffraction means having periodic structures in said medium with the angles $\theta_1 \ldots \theta_n$ being related to one another as the inverse of the ratio of their sines, whereby said optical element diffracts radiation of wavelengths $\lambda_1 \ldots \lambda_n$ through a common angle such that the general relationship $(\lambda_i/\lambda_j) = (\sin \theta_j/\sin \theta_i)$ obtains.

2. The method defined in claim 1 wherein the signal beam during the making of the first exposure in the recording medium is a diverging beam which has a focal length $F_1$ and wherein said signal beam during the making of the further exposures in said recording medium has a focal length $F_2 \ldots F_n$ respectively, said focal lengths being related to one another as the inverse of the ratio of the sines of the angles $\theta_1 \ldots \theta_n$, whereby the optical element diffracts radiation of wavelengths $\lambda_1 \ldots \lambda_n$ to a common focal point such that the general relationship $(F_i/F_j) = (\sin \theta_j/\sin \theta_i)$ obtains.

3. The method defined in claim 2 wherein the optical element being fabricated is a diffraction grating.

4. The method defined in claim 2 wherein the optical element being fabricated is a lens.

5. The method defined in claims 1 or 2 wherein the recording medium is about 20–100 microns in thickness.

6. The method defined in claim 1 wherein the periodic structures of the diffraction means formed by the exposures are in the surface of the recording medium whereby the optical element diffracts radiation of wavelengths $\lambda_1 \ldots \lambda_n$ through a common angle.

7. The method defined in claim 2 wherein the periodic structures of the diffraction means formed by the exposures are zone plates in the surface of the recording medium whereby the optical element diffracts radiation of wavelengths $\lambda_1 \ldots \lambda_n$ to a common focal point.

8. The method defined in claims 6 or 7 wherein the recording medium is less than 20 microns in thickness.

9. The method for fabricating an achromatic holographic optical element for diffracting radiation of wavelengths $\lambda_1 \ldots \lambda_n$ comprising the steps of:

making a first exposure in a three-dimensional photosensitive thick recording medium of the intersection of two pairs of mutually coherent electromagnetic beams having a wavelength of $\lambda_1$, each of said pairs of said beams comprising a signal and a reference beam, said signal beams being incident normal to said medium surface and said reference beams of said pairs being incident on said thick medium from either side of the medium normal at an angle of incidence $\theta_1$ to said surface normal, said exposure forming a first zone plate having periodic structures in said medium making further exposures in said recording medium of the intersection of further pairs of mutually coherent electromagnetic beams having a wavelength $\lambda_1$, each of said pairs comprising a signal and a reference beam, said reference beams of said pairs being incident on said thick medium from either side of the medium normal at angles of incidence of $\theta_2 \ldots \theta_n$ respectively, said exposures forming further overlapping zone plates having periodic structures in said medium with the angles $\theta_1 \ldots \theta_n$ being related to one another as the inverse of the ratio of their sines, whereby said thick medium optical element diffracts radiation of wavelengths $\lambda_1 \ldots \lambda_n$ as two output beams each having a common focal point such that the general relationship $(F_i/F_j) = (\sin \theta_j/\sin \theta_i)$ obtains.

10. The method defined in claim 9 wherein the recording medium is about 20–100 microns in thickness.

* * * * *